United States Patent Office 3,022,289
Patented Feb. 20, 1962

3,022,289
ACYLATION OF STARCH
John V. Tuschhoff and Clifford E. Smith, Decatur, Ill., assignors to A. E. Staley Manufacturing Company, Decatur, Ill., a corporation of Delaware
No Drawing. Filed Feb. 13, 1959, Ser. No. 792,972
24 Claims. (Cl. 260—233.5)

This invention relates to a new reaction of starch and to useful modified starch products obtained thereby. More particularly, it relates to the reaction of starch with vinylic esters of carboxylic acids and to modified starch products thus obtained which are characterized by altered paste properties and by significant acyl contents.

This application is a continuation-in-part of our co-pending application Serial No. 661,032, filed May 23, 1957, now abandoned, and also of application Serial No. 673,132, filed July 22, 1957, now Patent No. 2,928,828.

There are many references in the literature, both journal and patent, to the modification of starch by chemical derivation. Chapter 10 in the Second Edition of "Chemistry and Industry of Starch," edited by R. W. Kerr and published by Academic Press, Incorporated, is an excellent review of this field up to 1947.

The following United States Patents, which issued later, describe commercially useful methods for modifying the paste properties of starch by chemical reaction, resulting mostly in a minor degree of substitution or chemical derivation: Numbers 2,461,139, 2,500,950, 2,516,632, 2,516,633, 2,516,634, 2,654,736 and 2,660,577.

Much of the effort represented in the foregoing patents was aimed at altering some of the inherent properties of cereal starch pastes particularly the lack of tack or cohesiveness and the pronounced thickening (and gelling at the higher starch concentrations) of the pastes as they cool and age. Ordinary or non-waxy corn starch pastes exhibit these properties to a pronounced degree. As expressed in United States Patents 2,516,632-3-4, "It has long been the goal of starch research to make from corn starches products of commerce that would possess the properties or utility of the root starches or more recently the waxy starches."

In other instances, with reference to the prior art of chemically modified starches, there was a desire to change the paste property or pasting behavior of the starch in a special manner. Also, there was the desire to provide new starchy compositions of matter and to prepare old ones by new methods.

None of the prior art discloses or suggests our invention, the reaction of starch with vinyl esters of carboxylic acids in the presence of water.

We are aware that the chemical literature discloses the reaction of vinyl esters, vinyl acetate in particular, with hydroxy compounds. Examples are:

Zhur. Obshekei Khem. 23, 1953, 1738–1743,
J.A.C.S. 75, 1953, pp. 2678–2682,
United States Patent No. 2,342,612,
United States Patent No. 2,355,970, and
United States Patent No. 2,355,971.

The foregoing references are all concerned with the acylation of alcohols with vinyl esters. Without exception all emphasize that water should be absent because vinyl acetate is sensitive to hydrolysis. Accordingly, these references all discourage attempts to acylate starch in the presence of water. On the contrary, we have discovered not only that it is unnecessary to use anhydrous conditions and an organic medium, but that water is actually a necessary ingredient in reacting starch with vinyl esters.

The broad object of our invention is to provide useful compositions of matter, starches which have been modified by chemical reaction, and whose paste properties are usefully different from those of the parent starch.

Another object of our invention is to reduce the paste congealing property of non-waxy cereal starches, non-waxy corn starch in particular.

Another object of our invention is to provide chemically modified starches without altering the superficial granular structure of the starch or destroying the useful pasting properties of granular starches.

Still another object of our invention is to alter the paste properties of the waxy and non-cereal starches. Generally, this consists of reducing the pasting temperature of the granule and increasing the viscosity of the paste.

A further object of our invention is to provide a convenient and economical new reaction for chemically altering the paste properties of starch by a reaction which proceeds rapidly with granular starch in water slurry at room temperature.

The objects of our invention are accomplished by reacting starch with the vinyl ester of a carboxylic acid in the presence of an alkaline catalyst and water. We have found that water is necessary to acylate starch. However, we have found that unless more than about 10% weight percent water (based on dry substance starch) is used, the yields are so low that the process is not feasible commercially. Above about 10% water, the reaction efficiency increases rapidly and sharply.

Our invention applies to starches generally, whether waxy or non-waxy, and independently of their vegetable origin, i.e., whether derived from root, stem, or seed of the plant. The starch entering the reaction may be granular or pasted, and if granular, it may leave the reaction essentially unchanged in form. If desired, the starch may be pasted during the reaction and then used in that form or recovered as a dried paste by conventional drying methods.

The novel reaction of our invention proceeds readily with granular starch, and equally well or somewhat faster with starch pastes.

The preferred vinyl esters for reaction with starch are those of the lower aliphatic monocarboxylic acids. Vinyl formate, vinyl acetate, and vinyl propionate are all satisfactory with respect to reactivity and modification of starch properties. Reaction speed diminishes as the vinyl esters of higher fatty acids are employed, but useful results can be obtained with vinyl stearate. We have also found that the acids may contain certain substituents, for example, the vinyl esters of chloracetic and phenylacetic acids. We have further found that the vinyl ester of benzoic acid may be used in this new reaction.

The preferred catalyst for the reaction is one which buffers the reaction at about 9–10 pH. Sodium carbonate meets this requirement quite well, and is the most practical catalyst we have found. Other suitable catalysts are alkali metal hydroxides, quaternary ammonium hydroxides, ammonium hydroxide, and aliphatic amines. Useful reaction can be obtained over the pH range of about 7.5 to 12.5.

Reaction rate is moderately rapid with the preferred vinyl esters over the temperature range of 75° F. to 115° F. For example, the reaction between granular starch (in water suspension) and vinyl acetate is essentially complete within one hour or less at 100° F.

Useful but slower reaction rates are obtainable at temperatures as low as 35–40° F. Higher temperatures increase the rate of reaction and are limited only by the pasting temperature of starch where it is desired to preserve the granule form during reaction, otherwise by the decomposition temperature of starch. Reaction efficiency at the higher temperatures is improved by conducting the reaction in a closed vessel to prevent loss of volatile vinyl esters.

Commercially useful modification of paste properties may be obtained by reacting the starch with as little as 2% weight percent vinyl ester (based on dry substance). Higher proportions of ester, vinyl acetate in particular, are easily reacted with the starch, if desired. For example, one part (by weight) of vinyl acetate is readily reacted with ten parts of corn starch in an aqueous medium, yielding a non-congealing product with a higher hot paste viscosity than the original starch and containing about 3.5% acetyl group. By procedures illustrated later in the examples, modified starches with acetyl contents up to 25% may be obtained.

After the reaction has gone to completion, or the desired modification has been obtained, the reaction mixture is neutralized to about 6.5 pH with an acid, preferably an inexpensive one such as hydrochloric or sulfuric. The modified granular starch in the neutralized reaction slurry may be recovered by filtration and drying. The dried reaction product, in the form of separate starch granules, will exhibit the altered paste properties when cooked with water. The neutralized reaction pastes are ready for use, or the product can be recovered by rapid drying of the paste or precipitation therefrom with a dehydrating liquid such as methanol, ethanol, or acetone.

Since starch containing up to around 25% moisture still appears dry, i.e., it is superficially dry, such "dry" starch will react in accordance with the present invention. However, the reaction efficiency is suitable for commercial production only when the moisture content is greater than about 10%.

The reaction appears to be a trans-esterification. For example, acetaldehyde is a by-product of the reaction with a vinyl ester, and the starch acquires a saponification value corresponding to significant acyl contents.

Referring to one of the previously stated objects of our invention, to reduce the paste congealing property of non-waxy cereal starches, it will be recalled that this property is more often a defect than an asset. While the congealing properties of some pastes are exploited in the manufacture of gum drops and corrugated paperboard, elsewhere, as in the sizing of paper and textiles, it is generally objectionable and to be avoided. One objection in sizing operations is the necessity, and expense, of keeping the paste hot to maintain the desired fluidity at the required solids content. Another is that whenever the hot paste has an opportunity to cool and congeal, as around the edges of a supply tank or on machinery applying the paste to paper and textiles, or in supply systems after a shut-down, the congealed paste presents a cleaning problem. A third objection is that congealed pastes cannot be satisfactorily re-melted or restored to their original fluid condition. Reheating, for example, is ineffective. Once a quantity of hot paste has been prepared, it must be kept hot until used—or discarded.

For satisfactory use of starch in such foods as cream and fruit pies, puddings, and salad dressings, and in textile printing, it is important that the pasted starch be non-congealing. This is also desirable, as noted above, but not essential, in the sizing of paper and textiles.

By our invention, the congealing property of non-waxy cereal starch pastes can be easily and economically eliminated as required. Since non-waxy corn and wheat starches are the two major starches produced in this country the utility of our invention is apparent.

Our invention is further illustrated by the following examples, the specific details of which are not to be regarded as limitative.

EXAMPLES 1–7

This set of examples, based on the reaction of unmodified non-waxy commercial corn starch with vinyl acetate, demonstrates the wide assortment of alkaline catalysts which may be used. These conditions were constant in each example: 100 grams of the starch (12% moisture) was slurried with a solution of the catalyst (kind and amount indicated in Table 1) in 150 mls. of water at 100° F., then stirred for 60 minutes at the same temperature with 10 grams of vinyl acetate. The slurry was neutralized to 6–7 pH with sulfuric acid, and the starch was filtered, washed with water, and dried. Each reacted starch was examined for acetyl content, calculated from the saponification number, and for paste viscosity, both hot and cold, on a 6% paste in water alone. The hot paste was prepared by cooking 6 grams of the dried reaction product with 95 mls. of water at 90° C. for 15 minutes. For cold paste viscosity or congealing property, the same paste was cooled to 25° C., held 24 hours, and examined. Results were compared with a 6% hot and cold paste of the original starch. Kind and amount of catalyst used, reaction pH range, and acetyl content of the reacted starches are shown in Table 1.

*Table 1*

| Example No. | Kind of Catalyst | Amount of Catalyst, mols. | pH Range During Reaction | Percent Acetyl |
|---|---|---|---|---|
| 1 | NaOH | 0.062 | 12.2–9.5 | 2.2 |
| 2 | KOH | 0.062 | 12.3–9.6 | 2.7 |
| 3 | LiOH | 0.062 | 12.1–8.7 | 2.7 |
| 4 | $Na_2CO_3$ | 0.057 | 10.0–8.6 | 3.6 |
| 5 | $K_2CO_3$ | 0.057 | 10.2–8.9 | 3.6 |
| 6 | $NH_4OH$ | 0.20 | 10.1–8.4 | 2.3 |
| 7 | triethyl amine | 0.68 | 11.4–9.1 | 2.8 |

It was observed that all the reacted starches in the foregoing examples had a higher hot viscosity than the control unreacted starch, and that the cold pastes of the reaction products, though more viscous than the hot ones, were still fluid and smooth. The cold paste of the control starch congealed to a firm gel.

EXAMPLES 8–14

This set of examples, based on unmodified non-waxy commercial corn starch, illustrates the scope of the reaction with respect to kind of vinyl esters of monocarboxylic aliphatic acids. The following conditions were the same for all the examples: 100 grams of starch in granule form (12% moisture) was slurried with a solution of the catalyst in 150 mls. of water at 100° F. The vinyl ester was added to the slurry, and stirring was continued for one hour at the same temperature. The slurry was neutralized to 6–7 pH with sulfuric acid, and the treated starch was filtered, washed with water, and dried. Table 2 lists the kind and amount of different esters used, the kind and amount of catalyst, and the percent of acyl substitution obtained in the starch.

*Table 2*

| Example No. | Vinyl Ester | Grams of Vinyl Ester | Catalyst | Grams of Catalyst | Percent Acyl |
|---|---|---|---|---|---|
| 8 | formate | 7.0 | $Na_2CO_3$ | 3 | 1.7 |
| 9 | acetate | 8.2 | $Na_2CO_3$ | 3 | 2.9 |
| 10 | propionate | 9.7 | $Na_2CO_3$ | 3 | 3.0 |
| 11 | butyrate | 11.0 | $Na_2CO_3$ | 3 | 2.0 |
| 12 | crotonate | 5.0 | NaOH | 0.7 | 2.0 |
| 13 | 2 ethyl-hexoate | 20.0 | NaOH | 2.6 | 2.0 |
| 14 | stearate | 40.0 | KOH | 2.5 | 2.2 |

Water pastes of the reacted starches were prepared as described under Examples 1–7 and compared both hot and cold with a control paste made from the untreated starch. With the exception of the starch reacted with vinyl crotonate, which pasted at a higher temperature and gave a thinner hot (but non-congealing) paste than the control starch, all the examples pasted at the same or lower temperature than the control and gave a thicker hot paste which was still smooth and fluid after cooling and aging.

EXAMPLES 15-22

This group of examples illustrates that the reaction is applicable to starches in general. The following conditions were the same throughout. 100 grams of the commercial starch in granule form (12% moisture) was slurried with a solution of the catalyst in 150 mls. of water at 80° F. Vinyl acetate was added and the mixture was stirred for one hour at the same temperature. The slurry was neutralized to 6-7 pH with sulfuric acid, and the reacted starch was filtered, washed with water, and dried. Table 3 lists the different starches, the kind and amount of catalyst, and the amount of vinyl acetate used.

*Table 3*

| Example No. | Kind of Starch | Amount of Vinyl Acetate, gms. | Kind of Catalyst | Amount of Catalyst, gms. | Percent Acetyl |
|---|---|---|---|---|---|
| 15 | Irish potato | 5 | $Na_2CO_3$ | 2 | 1.4 |
| 16 | Waxy maize | 5 | $Na_2CO_3$ | 2 | 1.5 |
| 17 | Tapioca | 5 | $Na_2CO_3$ | 2 | 1.5 |
| 18 | High amylose corn | 20 | $Na_2CO_3$ | 2 | 9.3 |
| 19 | Regular corn | 5 | NaOH | 0.7 | 1.5 |
| 20 | Thick boiling corn | 5 | NaOH | 0.7 | 1.4 |
| 21 | Acid-modified corn | 5 | NaOH | 0.7 | 1.5 |
| 22 | Hypochlorite oxidized corn | 5 | NaOH | 0.7 | 1.4 |

Each reacted starch was pasted and compared, both hot and cold, with a control, i.e., a paste of the corresponding unreacted starch. Pasting conditions were: 6 grams of the dried starch in 95 mls. of water at 90° C. for 15 minutes, then cooled to 25° C. and allowed to age 24 hours.

All of the starches were modified by the reaction with vinyl acetate. Pasting temperature of the Irish potato starch was lowered about 5° C., and the hot paste of the reacted starch was more viscous and cohesive than the control. The cold paste of the treated starch was non-congealing. Pasting temperatures of the waxy-maize and tapioca starches were also lowered about 5° C., and viscosity of the hot pastes was increased. The treated tapioca starch was more cohesive than the control. The untreated high amylose corn starch did not paste at 90° C., but the treated starch pasted at about 75° C., yielding a smooth, non-congealing paste somewhat less viscous at 90° C. than regular corn starch.

The thick-boiling corn starch of Example 20 was prepared according to United States Patent 2,407,071. Treating it with vinyl acetate as described almost doubled the hot paste viscosity and transformed the cold paste from a firm gel with a gel strength of 800 gram-centimeters torque into a smooth fluid paste having only 15 gram-centimeters torque. Gel strength was measured as described in Cereal Chemistry, vol. 32, No. 3, p. 200, May 1955, and paste viscosity was measured on a Corn Industries Research Foundation viscometer.

The hot pastes of the treated starches in Examples 21 and 22 were much thicker than those of the untreated controls, and after cooling and aging they remained smooth and substantially non-congealing. The cooled and aged pastes of the control starches congealed.

EXAMPLES 23-28

This group of examples illustrates the wide range of acetylation obtainable in the reaction of corn starch with vinyl acetate. In each example, 100 grams of commercial non-waxy corn starch was slurried with a solution of the catalyst in 150 mls. of water at 80° F., then stirred for 45 minutes at the same temperature with the vinyl acetate. In Examples 26, 27, and 28, the vinyl acetate and catalyst were added in 2, 4, and 5 equal portions, respectively, with the starch being neutralized, filtered, and washed with water between each addition. Ratio of catalyst (soda ash) to vinyl acetate was 3 to 10. Table 4 lists the amounts of vinyl acetate and soda ash used, the number of additions of reagent, and the acetyl contents of the treated starches.

*Table 4*

| Example No. | Weight of Vinyl Acetate, gms. | Weight of Soda Ash, gms. | Number of Additions | Percent Acetyl |
|---|---|---|---|---|
| 23 | 10 | 3 | 1 | 3.6 |
| 24 | 20 | 6 | 1 | 6.0 |
| 25 | 30 | 9 | 1 | 7.9 |
| 26 | 60 | 18 | 2 | 13.7 |
| 27 | 120 | 36 | 4 | 23.1 |
| 28 | 150 | 45 | 5 | 25.1 |

EXAMPLE 29

One hundred grams of corn starch containing the normal commercial water content (about 12% moisture) was thoroughly blended with 5 grams of vinyl acetate and one gram of soda ash in a closed mixer. pH of a water slurry of a sample of the mixture was 9.6. While being agitated constantly, the mixture was heated four hours at a temperature that developed a gage pressure of 10 lbs./sq. in. in the reaction chamber. The starch was removed from the mixer, slurried in water, filtered, washed with water, and dried. The paste formed by the product in hot water was smooth, viscous and non-congealing.

EXAMPLE 30

One hundred grams of commercial corn starch was pasted with 1600 mls. of water at 90° C., then cooled to 70° C. To the hot paste was added 10 grams of vinyl acetate and 3 grams of soda ash and stirring was continued for one hour. The resultant hot paste was more viscous than a control paste at the same temperature, but on cooling to room temperature and aging for 24 hours, it remained smooth and fluid. A control paste congealed to a firm gel under these conditions.

EXAMPLES 31-36

This experiment was performed to determine the effect of moisture on the reaction between starch and vinyl acetate in the presence of an alkaline catalyst. In each example, 400 grams (dry substance) of granular, unpasted starch were each thoroughly blended with 12 grams of the soda ash in 40 cc. of water. Each sample was then dried to the desired moisture content or additional water was added. Then 40 grams of vinyl acetate were added. While being agitated constantly, the mixture was reacted at room temperature (about 75° F.) for one hour. An analytical sample was taken, washed with ethanol to remove unreacted vinyl acetate and then slurried in water. The slurry was made neutral with hydrochloric acid, filtered, washed with water and dried. The dried samples were analyzed for acetyl content by saponification. The pastes formed by the products of the starch samples containing more than 10% moisture were smooth, viscous and non-congealing even after cooling to room temperature and standing 24 hours. The analytical results which are accurate to about 0.1% acetyl are tabulated in Table 4; reaction efficiency, expressed as a percentage is:

$$\frac{\text{Total acetyl found by assay}}{\text{Weight of vinyl acetate} \times 0.5} \times 100$$

*Table 5*

| Example No. | Percent Moisture | Percent Acetyl | Percent Efficiency |
|---|---|---|---|
| 31 | 0 | [1] 0.15 | 0.0 |
| 32 | 5 | 0.27 | 2.4 |
| 33 | 10 | 0.41 | 5.2 |
| 34 | 15 | 2.31 | 43.2 |
| 35 | 20 | 3.47 | 66.4 |
| 36 | 65 | 3.80 | 73.0 |

[1] Value of blank.

A similar experiment which was run for four hours with zero moisture content yielded a product with no detectable acetyl content.

EXAMPLES 37-40

This experiment was performed to determine further the effect of water on the reaction of this invention. The conditions of Examples 31-36 were duplicated except that the catalyst was triethylamine. Since the triethylamine is a liquid, the native corn starch was impregnated with it, alone and undiluted, in an amount equivalent to 4% by weight based on the starch (dry substance). The results are tabulated in Table 6.

*Table 6*

| Example No. | Percent Moisture | Percent Acetyl | Percent Efficiency |
|---|---|---|---|
| 37 | 0 | [1] 0.10 | 0.0 |
| 38 | 10 | 0.43 | 6.6 |
| 39 | 20 | 3.12 | 60.4 |
| 40 | 65 | 3.82 | 74.5 |

[1] Value of blank.

Examples 31-40 illustrate effectively that the presence of water is necessary to obtain an acylation reaction between starch and a vinyl ester. We have also attempted to perform this reaction with vinyl acetate using toluene as a solvent under reflux conditions to keep the reactants anhydrous. The catalysts used were sodium carbonate, sodium hydroxide, pyridine and trimethylammonium hydroxide. In none of the attempts was the starch acetylated. These results are in direct contrast to the suggestions of the prior art that water is to be avoided in the reaction between alcohols and vinyl esters in order to acylate the alcohol.

EXAMPLES 40 AND 41

These examples illustrate further the scope of the reaction with respect to the kind of vinyl esters. To 500 grams (dry substance) of granular starch in a 35.5% (20° Bé.) water slurry, there was added 3% by weight soda ash and 7% of vinyl benzoate. Another sample was prepared in the same proportions with vinyl chloracetate. Both samples were reacted for 30 minutes at room temperature (about 75° F.). The pH of each was adjusted to 7 with hydrochloric acid. The samples were filtered, washed and dried. Each sample analyzed 2.5% substitution. The modified starch samples were cooled in hot water and each produced a smooth, viscous, non-congealing paste.

The acetate radical may also have other substituents. Other halides than chlorine may be substituted, i.e., bromine, fluorine or iodine. Also, the acetate radical may be substituted with a phenyl group. These are examples of mono-substituted acids in which the substituent is on the carbon atom adjacent to the carboxyl carbon and these are preferred.

We have also found that the vinyl acetate may be replaced by other vinylic esters of acetic acid. This is illustrated in the following example.

EXAMPLE 42

To 500 grams of dry substance starch in a slurry there were added 3% soda ash and 40 grams of allylidene diacetate. The pH of the reaction mixture declined from 10.2 to 8.0 in about 45 minutes. The pH was then adjusted to 6.5 and the reaction product was filtered from the slurry, washed and dried. The analytical results indicated that the acetyl content was 2.8%.

The modified starch thus produced was cooked using 10 grams of the solids to 150 grams of water. The resulting starch paste was quite thin, indicating that it was partially inhibited in its pasting properties. This characteristic, sometimes thought to result from cross-linking, is attributed to the formation of acrolein during the reaction, with the acrolein serving as the cross-linking agent. This effect of acrolein on starch is disclosed in our copending application Serial Number 692,024, filed October 24, 1957, now abandoned. We have also found that the same effect, the inhibition of the pasting property of the starch, is produced when the starch is being acylated by reacting the granular starch in accordance with our invention with vinyl acrylate or with vinyl crotonate. In these cases, as in the case of allylidene diacetate, the reaction involves a vinylic ester having a polymerizable vinyl group that is available for reaction after transfer of the ester acyl group to the starch.

Vinylidene diacetate ester will also be useful in preparing modified starches in accordance with the method described herein and, in this case, ketene will be produced. Ketene is also an acetylating agent for starch.

Vinyl esters of aromatic acids other than benzoic will be useful in this reaction, for example, the alpha and beta isomers of vinyl naphthoate. Further, the variety of vinylic esters which are reactive in our process has led us to the conclusion that vinylic esters of polycarboxylic acids are included within the scope of our invention, and of these the dicarboxylic acids are preferred.

Since many embodiments of this invention may be made and since many variations in the details disclosed are possible, the foregoing description is to be interpreted as illustrative only. The scope of our invention is set forth in the following claims.

We claim:

1. The method of chemically modifying starch that comprises reacting starch in the presence of an alkaline catlyst and more than about 10% water by weight of dry substance starch with an ester of a carboxylic acid and an ethylenically unsaturated alcohol radical of fewer than four carbon atoms.

2. The method of chemically modifying starch that comprises reacting starch in the presence of an alkaline catalyst and more than about 10% water by weight of dry substance starch with an ester of a carboxylic acid and an ethylenically unsaturated alcohol radical of fewer than four carbon atoms, the ester containing fewer than three acid groups.

3. The method of chemically modifying starch that comprises reacting starch in the presence of an alkaline catalyst and more than about 10% water by weight of the dry starch with an ester of a carboxylic acid, and an ethylenically unsaturated alcohol radical selected from vinyl and allylidene.

4. The method of chemically modifying starch that comprises reacting starch in the presence of an alkaline catalyst and more than 10% water by weight of dry substance starch with an ester of a carboxylic acid selected from the group consisting of aliphatic, benzoic and phenyl acetic acids, and an ethylenically unsaturated alcohol radical having fewer than four carbon atoms, the ester containing fewer than three acid groups.

5. The method of claim 4 in which the unsaturated alcohol radical is selected from vinyl and allylidene.

6. The method of chemically modifying starch that comprises reacting starch in the presence of an alkaline catalyst and more than about 10% water by weight of dry substance starch with an ester of an ethylenically unsaturated alcohol radical of fewer than four carbon atoms and an aliphatic monocarboxylic acid, the ester containing fewer than three acid radicals.

7. The method of chemically modifying starch that comprises reacting starch in the presence of an alkaline catalyst with more than about 10% water by weight of dry substance starch with a vinyl ester of a haloacetic acid.

8. The method of chemically modifying starch that comprises reacting starch in the presence of an alkaline catalyst and more than about 10% water by weight of dry substance starch with an ester of acetic acid and an ethylenically unsaturated alcohol radical of fewer than four carbon atoms, the ester containing fewer than three acid groups.

9. The method of chemically modifying starch that comprises reacting starch in the presence of an alkaline catalyst and more than about 10% water by weight of dry substance starch with an ester of acetic acid selected fromt he group vinyl and allylidene.

10. The method of chemically modifying starch that comprises reacting starch with vinyl acetate in the presence of an alkaline catalyst and more than about 10% water by weight of dry substance starch.

11. The method of chemically modifying starch that comprises reacting starch with vinyl formate in the presence of an alkaline catalyst and more than about 10% water by weight of dry substance starch.

12. The method of chemically modifying starch that comprises reacting starch with vinyl propionate in the presence of an alkaline catalyst and more than about 10% water by weight of dry substance starch.

13. The method of chemically modifying starch that comprises reacting starch with vinyl benzoate in the presence of an alkaline catalyst and more than about 10% water by weight of dry substance starch.

14. The method of chemically modifying starch that comprises reacting starch with allylidene diacetate in the presence of an alkaline catalyst and more than about 10% water by weight of dry substance starch.

15. The method of chemically modifying starch that comprises reacting an aqueous starch paste in the presence of an alkaline catalyst with an ester of a monocarboxylic acid and an ethylenically unsaturated alcohol radical of fewer than four carbon atoms.

16. The method of chemically modifying starch that comprises reacting an aqueous suspension of granular unpasted starch in the presence of an alkaline catalyst with an ester of a monocarboxylic acid and an ethylenically unsaturated alcohol radical of fewer than four carbon atoms.

17. The method of chemically modifying starch that comprises reacting an aqueous suspension of granular unpasted starch in the presence of an alkaline catalyst at a pH in the range of 7.5 to 12.5 with an ester of a monocarboxylic acid and an ethylenically unsaturated alcohol radical of fewer than four carbon atoms.

18. The method of claim 17 in which the ester contains fewer than three acid radicals.

19. The method of chemically modifying starch that comprises reacting an aqueous suspension of granular unpasted starch in the presence of an alkaline catalyst at a pH in the range of 7.5 to 12.5 with an ester of a monocarboxylic acid selected from the group consisting of aliphatic, benzoic and phenylacetic acids, and an ethylenically unsaturated alcohol radical selected from the group vinyl and allylidene.

20. The method of chemically modifying starch that comprises reacting an aqueous suspension of granular unpasted starch in the presence of an alkaline catalyst at a pH in the range of 7.5 to 12.5 with an ester of acetic acid selected from the group vinyl and vinylidene.

21. A chemically modified, granular, unpasted starch partially inhibited in its pasting properties through reaction with allylidene diacetate.

22. A chemically modified, granular, unpasted starch partially inhibited in its pasting properties by reaction with vinyl acrylate.

23. A chemically modified, granular, unpasted starch partially inhibited in its pasting properties by reaction with vinyl crotonate.

24. The reaction product of starch and an ester selected from the group consisting of allylidene diacetate, vinyl acrylate and vinyl crotonate.

References Cited in the file of this patent

UNITED STATES PATENTS

| | | |
|---|---|---|
| 2,342,612 | Hansley | Feb. 22, 1944 |
| 2,461,139 | Caldwell | Feb. 8, 1949 |
| 2,928,828 | Smith et al. | Mar. 15, 1960 |

FOREIGN PATENTS

| | | |
|---|---|---|
| 109,053 | Germany | Feb. 5, 1900 |
| 129,884 | Germany | Mar. 22, 1902 |

UNITED STATES PATENT OFFICE
CERTIFICATE OF CORRECTION

Patent No. 3,022,289                          February 20, 1962

John V. Tuschhoff et al.

It is hereby certified that error appears in the above numbered patent requiring correction and that the said Letters Patent should read as corrected below.

Column 7, line 47, for "cooled" read --- cooked ---.

Signed and sealed this 28th day of August 1962.

(SEAL)
Attest:

ESTON G. JOHNSON

Attesting Officer

DAVID L. LADD
Commissioner of Patents